Patented Nov. 18, 1941

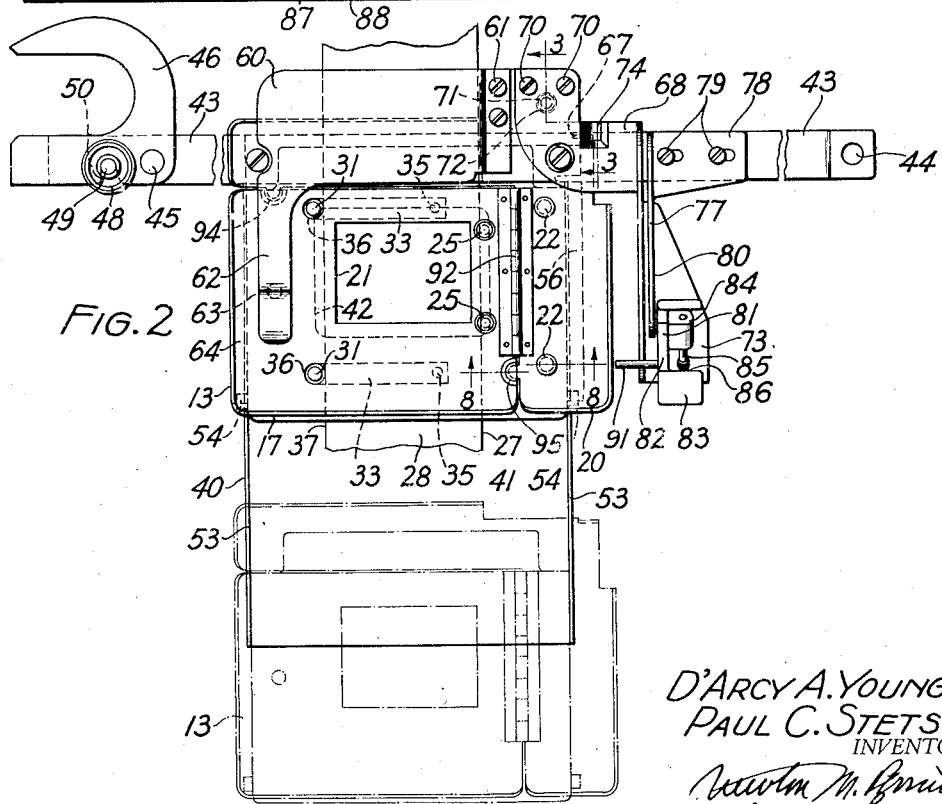

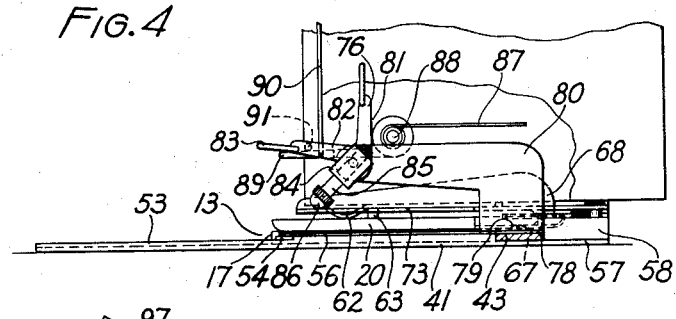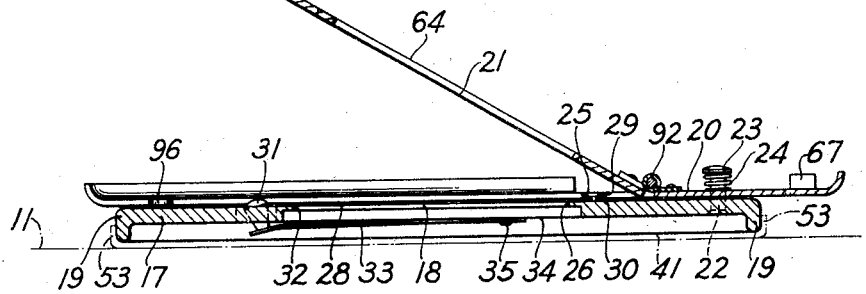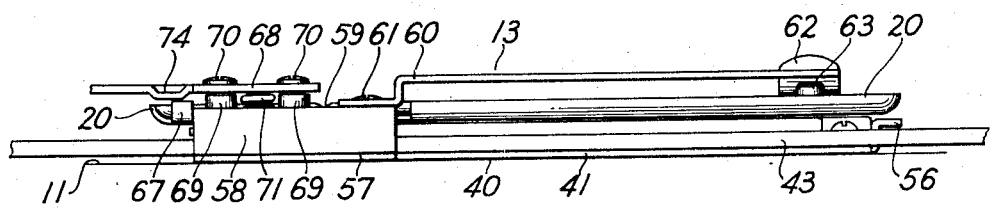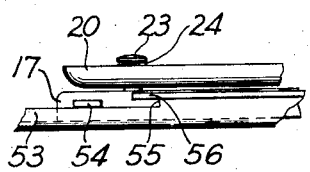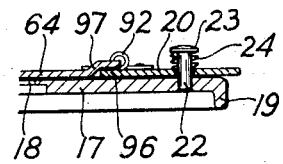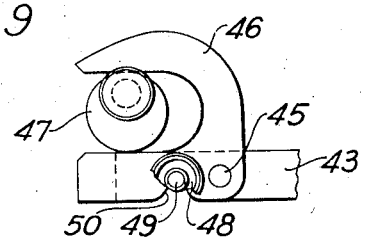

2,263,025

UNITED STATES PATENT OFFICE 2,263,025

GLASSLESS FILM GATE FOR ENLARGING PRINTERS

D'Arcy A. Young, Jr., and Paul C. Stetson, Rochester, N. Y., assignors to Eastman Kodak Company, Rochester, N. Y., a corporation of New Jersey Application June 23, 1939, Serial No. 280,800

12 Claims. (Cl. 88—24)

This invention relates to photography, and more particularly to a film gate adapted for use with an enlarging or projection printer, and arranged to securely hold and position separate image areas, or image areas arranged in strip form, so that enlarged prints can be made therefrom. This film gate is particularly designed for use with an enlarging printer of the type shown and described in the patent to R. S. Hopkins, Number 2,033,712, dated March 10, 1936.

One object of the invention is the provision of a film gate adapted for use with miniature negatives either in strip form or separate negatives cut from a strip.

Another object of the invention is the provision of a gate of this class in which the image areas may be readily and easily inserted in position in the film gate, and when so inserted are held in flat position without the use of glass clamping strips.

Still another object of the invention is the provision of an arrangement by which the film gate may be opened to permit a film strip to be moved therethrough without necessitating the removal of the gate from printing position.

Yet another object of the invention is the provision of an arrangement whereby the opening of the film gate also serves to rotate a shutter shaft to move a light obstruction shutter to a non-obstruction position and to also turn on a viewing lamp. By means of this arrangement, the opening of the film gate moves the shutter to open position and also turns on the viewing lamp to permit viewing of the image area being positioned in the film gate.

Another object of the invention is the provision of interchangeable gate members, each of which is intended for use with a particular film so that prints may be made from a variety of sizes of miniature negatives.

To these and other ends, the invention resides in certain improvements and combinations of parts all as will be hereinafter more fully described, the novel features being pointed out in the claims at the end of the specification.

In the drawings:

Fig. 1 is a front view of the upper portion of the above-mentioned enlarging printer, showing the relation thereto of a miniature glassless film gate constructed in accordance with the present invention;

Fig. 2 is a plan view of a glassless film gate constructed in accordance with the preferred embodiment of the invention;

Fig. 3 is a vertical sectional view through a portion of the gate mechanism illustrated in Fig. 2, and taken substantially on lines 3—3 thereof, showing the mounting means for the gate opening arm;

Fig. 4 is a side view of the lower end of the portion illustrated in Fig. 1, and on a larger scale than the latter, showing the arrangement by which the shutter is moved to a non-obstructing position when the film gate is open;

Fig. 5 is a longitudinal sectional view through the film gate, showing the arrangement of the various parts;

Fig. 6 is a rear view of the film gate and its operating mechanism, showing the relative position of the movable gate member and its operating arm;

Fig. 7 is a side view of a portion of the film gate and the supporting base, showing the mechanism for accurately positioning the gate on the base;

Fig. 8 is a vertical sectional view through a portion of the film gate and taken substantially on the line 8—8 of Fig. 2, showing one of the pivots for movably connecting the two gate members, and the arrangement for lifting the hinge portion of the upper gate member when the gate member is moved to open the film gate; and Fig. 9 is a fragmentary plan view of a portion of the mechanism shown in Fig. 1, showing the arrangement whereby the film gate and its supporting base may be adjusted on the printer table to position the gate thereon.

The same reference numerals throughout the various views indicate the same parts.

In Fig. 1 there is shown a portion of the enlarging printer embodied in the above-mentioned patent to Hopkins. This printer comprises broadly, a support having a flat portion or table top 11 which is maintained in proper elevated position by a plurality of supporting legs, not shown. The light directing housing 12 is supported by and extends upwardly from the table top 11, as shown in Fig. 1. The film or image area to be printed is positioned in a film gate, generally indicated by the numeral 13, mounted on the table top 11. The lamp source, positioned below the table top 11, projects the film image upwardly onto a sensitized paper surface positioned on the printing platen, indicated at 14 and fully described in the patent to Hopkins to which reference may be had for more detailed description of the mechanism.

The present invention relates more specifically to a glassless film gate in which image areas of a filmstrip, or areas cut from the strip, may be selectively positioned so that prints may be made therefrom. This film gate comprises a pair of hinged members which are arranged to not only position the film areas in proper registration with the gate apertures, but to also maintain the areas in flat position across said apertures, thus eliminating the use of the usual glass clamping strips, the advantages of which will be apparent to those in the art.

This film gate is slidably mounted on a suitable base which is detachably mounted on the top 11 so that the base and the film gate may be readily mounted on or removed from the table top. The film gate itself is also removable from the base so that different gate members may be interchangeably used, each gate being designed for a particular type of film and being formed with gate apertures which frame the image areas of the film being used. These gates are readily and easily interchanged so that prints from different films may be quickly made without necessitating the removal of the base from the table top. When strip film is used, the image areas are moved through the gates without removing the latter from printing position. When, however, separate image areas are to be printed, the gate is slid on the base out of printing position. The gate is then opened and the separate image area is inserted in position therein, after which the gate is closed and then slid into operative position so that prints may be made from the separate image area positioned in the gate.

The film gate 13 comprises a lower plate or member 17 having a central aperture 18 and formed with depending sides 19 arranged to engage a base to be later described. Another plate or member 20 overlies the lower member and is formed with a central aperture 21 arranged in registry with the aperture 18 of the lower plate. These apertures are of such size as to frame the image area of the particular film being used. Obviously, the various gates will have different size apertures to correspond with the films for which they are designed. The upper plate is pivotally mounted on the lower plate so that it may be moved relative thereto to separate the plates to permit the film strip to be moved therethrough.

To this end, the lower plate 17 is provided with a pair of upstanding studs 22 which project through the upper plate 20 and terminate in head portions 23 spaced from the plate 20, as shown in Figs. 5 and 8. Coil springs 24 are wrapped around the studs 22 and are held in place between the heads 23 and the plate 20, as is apparent from inspection of Figs. 5 and 6. These studs thus provide a pivotal connection between the two gate plates or members so that when the right edge of the upper plate, as viewed in Fig. 5, is depressed, the upper plate will move in a clockwise direction about the studs 22 as pivots to separate the plates slightly to permit the film strip to move therethrough. When the upper plate is released, the spring 24 serves to return the plate 20 to film clamping position as is apparent from inspection of Fig. 5.

The lower plate member 17 is also provided with a pair of fixed positioning pins 25 arranged adjacent one edge 26 of the aperture 18, and adapted to engage a marginal edge 27 of the film strip 28, as shown in Fig. 2, to position the strip in lateral alignment with the gate apertures 18 and 21. When the film gate is opened, in a manner to be later described, the film strip is inserted between the gate members from the left, as viewed in Figs. 2 and 5, until the edge 27 engages the fixed positioning pins 25. In order to insure proper lateral positioning of the film strip, the pins 25 are formed with inclined cam surfaces 29 which cam the edge 27 of the film downwardly into engagement with the lower plate 17. These cams 29 terminate in shoulders 30 which maintain the film against the plate 17, as will be understood from an inspection of Fig. 5.

The plate 17 is also provided with a second set of positioning pins 31 arranged adjacent the opposite edge 32 of the aperture 18. As the film strip is inserted from the left, it is apparent that if the pins 31 were fixed, it would be difficult if not impossible to insert the strip between the gate members. For this reason, the pins 31 are mounted so that they may be automatically moved to a retracted or inoperative position during the film inserting operation. To this end, the pins 31 are mounted on the free ends of leaf springs 33 which extend across the under surface 34 of the plate 17 and have the ends thereof anchored by means of rivets 35, or other suitable fastening means. The pins 31 project through registering openings 36 in the plate 17 so that the pins normally lie above the upper surface thereof, as shown in Fig. 5. It is apparent from an inspection of this figure that when the film strip is inserted, the leading marginal edge 27 will engage the pins 31 to press the latter downwardly into the opening 36 to a retracted position to permit the film strip to be slid thereover. When, however, the edge 27 engages the fixed pins 25, the leaf springs 33 return the pins 31 to their normal position to engage the opposite marginal edges 37 of the strip 28 and to cooperate with the fixed pins 25 to laterally align the strip in registry with the gate apertures 18 and 21, as clearly illustrated in Fig. 2.

The above-described film gate may be positioned directly on the table top 11 and in alignment with the light openings thereof. It is preferred, however, to slidably mount the gate on a base, generally indicated by the numeral 40. This base is in the form of a flat plate 41 formed with an aperture 42, see Fig. 2, arranged to be positioned in registry with the light aperture, not shown, in the table top 11. The aperture 42 of the base is of such size as to accommodate the largest size gate apertures which will be used. A locating bar 43 is secured to the plate 41 adjacent the rear edge thereof, and has one end formed with an opening 44 adapted to receive a member for detachably securing the right end of the bar to the table top 11. The other end of the bar has pivoted thereon, at 45, a C-shaped catch 46, see Figs. 2 and 9, arranged to engage a cam 47 mounted on the table top 11. The rotation of the cam serves to pivot the bar 43 about its right end, as viewed in Fig. 2, to adjust the base plate 41 to bring the aperture 42 thereof into alignment with the light opening in the table top. The catch 46 is held in operative position, as shown in Figs. 2 and 9, by means of a thumbscrew 48 threadably mounted on a stud 49 positioned in an open-end slot 50 formed in a leg of the catch 46 as shown in Fig. 9.

With such an arrangement, the plate 41 and its film gate 13 may be readily and easily withdrawn from under the light housing 12 by merely releasing the thumbscrew 48 and swinging the bar 43 about its right end as a pivot, the catch 46 moving about the pin 45 until it is disengaged from the cam 47. When the base and gate have been thus withdrawn, the entire assembly may be removed as a unit from the table top 11. In normal operation, however, the bar 43 and the base 40 remain in position on the table top 11, and may be broadly considered therewith as a support for the removable film gate.

The opposite sides of the base plate 41 are turned upwardly to provide guide rails 53 which are arranged to engage the opposite sides 19 of the gate plate 17, as shown in Fig. 5, to provide guide means for the gate as the latter is moved into and out of printing position, as will be later described. When the gate has been properly positioned so that the gate apertures 18 and 21 are in registry with the openings 42 of the base plate 41, a pair of laterally projecting lugs 54 on the lower gate plate 17 engage shoulders 55 formed on the rail 53, see Fig. 7, to arrest further inward movement of the gate and to thus accurately position the latter on the base plate 41. When the lugs 54 thus engage the shoulder 55, they are positioned under overhanging flanges 56 formed by turning the upper edges of the rails 53 outwardly. These flanges engage the lugs 54 to prevent movement of the lower gate member 17 when the upper plate 20 is pivoted to open the gate, as will be later described.

A portion 57 of the base plate 41 extends rearwardly beyond the locating bar 43, and has secured thereto a spacer member 58 the upper surface 59 of which lies substantially in the plane of the top of the gate member 20, as shown in Fig. 6. A plate 60, of the shape best shown in Fig. 2, has one end thereof secured by screws 61 to the surface 59 of the spacer 58 while the free end is formed to provide a thin flexible resilient member or finger 62 which is arranged to engage an upstanding stud 63 formed on a portion 64 of the upper plate 20. This finger yieldably presses the upper gate member downwardly to securely clamp the film between the gate members and to retain the film in flat position over the gate aperture without the use of glass clamping strips. As the finger 62 is on the base 40 and the latter may be broadly considered as part of the gate support, the finger 62 may be designated as means on the support to retain the gate in closed position.

It is apparent from an inspection of Fig. 2 that if the right edge of the upper gate plate 20 is depressed, the latter will pivot about the studs 22 to move the left edge of the plate 20 upwardly and out of contact with a lower plate 17, against the action of the springs 24 and the member 62, to open the gate so that the film strip 28 may be inserted therein. To secure this result, the upper gate member 20 is provided with a lug 67, which, when the gate is in operative position, is arranged under a cantilever gate operating arm 68 one end of which is mounted on studs 69 secured to and extending upwardly from the spacer 58, see Fig. 6. Screws 70 extend through the arm 68 and into threaded openings in the studs 69 to secure the arm 68 thereto. A coil spring 71 is positioned in a well or recess 72 formed in the spacer 58 and engaging the under surface of the arm 68, see Fig. 3, to hold the latter out of engagement with the lug 67, as shown in Fig. 6. The studs 69 thus provide pivots about which the arm 68 may be moved into and out of engagement with the lug 67.

In order to open the gate, the free or outer end 73 of the arm 68 is depressed thus bringing a countersunk portion 74 of the arm into engagement with the lug 67 of the upper gate member 20. Such engagement pivots the plate 20 about the studs 22 to lift the upper plate and thus open the gate so that the film strip may be inserted therein, as is apparent. After the film strip has been properly positioned in the gate, the arm 68 is then released and is returned to an inoperative position by the coil spring 71. The springs 24 surrounding the studs 22 then cooperate with the resilient member or finger 62 to again move the upper plate 20 downwardly to close the gate.

It is sometimes desirable, however, to hold the gate in open position so that the film area may be carefully examined while being positioned in the film gate. Obviously, the arm 68 may be held in this depressed position to retain the gate open, but it is preferred to provide an arm actuating or controlling member which will not only move the arm to the gate opening position, but will also lock or retain the arm in that position until positively released. To secure this result, an L-shaped bracket 77 has one leg 78 thereof secured by screws 79 to the locating bar 73, as shown in Fig. 2. The other leg 80 extends over the gate operating arm 68, see Fig. 2, and has rotatably mounted thereon a bellcrank 81 one arm 82 of which is formed to provide a fingerpiece 83. A threaded lug 84 is formed on the side of the bellcrank and is arranged to receive a screw 85 formed with a rounded head 86 adapted to engage the free end 73 of the gate operating arm 58.

Referring now to Fig. 4, it is apparent that if the finger-piece 83 is depressed, the bellcrank 81 will be rotated in a counter-clockwise direction to bring the head 86 of the screw 85 into engagement with the arm 68 to pivot the latter to open the gate, as above described. When, however, the gate has been fully opened, the screw head has been moved to a position to lock the bellcrank in its depressed position thus holding the gate open. If the gate is to be closed, the other arm 76 of the bellcrank is moved to rotate the bell crank in a clockwise direction, as viewed in Fig. 4, to move the head 86 out of engagement with the arm 68.

It is thus evident from the above description that the gate is normally maintained in closed position by means of the coil springs 24 and the resilient finger 62 so as to clamp the film in a flat position over the gate aperture so as to enable prints to be made therefrom. However, when the strip is to be moved through the gate to bring another image area into printing position, the gate is first opened before moving the film strip, for obvious reasons. The gate is opened by rotating the bellcrank in one direction, as pointed out above, and maintained in open position to permit proper inspection and location of the image area which is to be printed, after which the gate is closed to clamp the film by rotating the bellcrank in the opposite direction.

The opening of the gate also serves to move a light obstructing shutter 87, see Fig. 4, to an inoperative position so as to permit viewing of the image area being positioned in the film gate. Fig. 4 shows a shutter 87 in position to obstruct the light rays that pass through the gate aperture to prevent these light rays from reaching the sensitized material positioned on the printing platen 14. The shutter is mounted on a shaft 88 which is journaled in opposite sides of the housing 12, as shown in Fig. 1, and completely disclosed and described in the patent to Schubert, #2,153,159, dated April 4, 1939. If the shaft 88 is rotated in a counter-clockwise direction, as viewed in Fig. 4, the shutter 87 will be moved to a non-obstructing position so that the image area in the gate may be viewed, as is apparent. The shaft 88 also carries a radially extending arm 89 positioned outside the housing 12, see Fig. 4. This arm is arranged to engage a rod 90 which is operatively connected to and which controls a light switch for a viewing lamp positioned below the table top 11. This light switch and the light controlled thereby are fully disclosed and described in the above referred to patent to Hopkins. Thus the rotating of the shutter shaft not only moves the shutter 87 to a non-obstructing position but also turns on a viewing lamp positioned below the film gate so that the image in the gate may be viewed and inspected.

As such viewing is performed when the gate is open, the present invention provides an arrangement whereby the gate opening mechanism is utilized to also move the shutter to a non-obstructing position to also turn on the viewing lamp. To this end, the bellcrank 81 is provided with a laterally extending pin 91 which engages the arm 89 on the shutter shaft 88, see Fig. 4. It is now apparent that when the bellcrank is rotated to open the gate, see Fig. 4, the pin 91 will engage the arm 89 to also rotate the shutter shaft 88 to move the shutter 87 to a non-obstructing position and to also operate the lamp rod 90. By means of this arrangement, the opening of the film gate permits the viewing of the image area which is being positioned therein.

As mentioned above, the film gates are interchangeable, each gate being designed for a particular type of film and image size. The gate shown in Fig. 2 is intended for use with a film in which the long way of the image is transversely of the film strip. In other types of film, however, the long way of the image is longitudinally of the film strip. With the latter type of film the strip is fed through the gate in the direction normal to that shown in Fig. 2. While the above gates have been described in connection with image areas arranged in strip form, they are also admirably adapted to hold and position separate image areas which have been severed from a film strip.

In order to adapt the gate to the use of cut film, the upper gate member is provided with the portion 64 which is connected to the plate 20 by means of a hinge 92. This portion 64 is provided with the gate aperture 21, mentioned above, and may be broadly considered as a part of the upper plate 20. In fact when used with strip film the plate 20 and the portion 64 act as a unit, as later pointed out. When, however, separate cut films are to be used, the film gate is slid on the base plate 40 to an inoperative position, as shown in broken lines in Fig. 2. The portion 64 is then swung on the hinge 92 to open the gate as shown in Fig. 5, after which the separate film image is then placed on the lower plate 17 so that the image areas register with the aperture 18 thereof, at which time the positioning pins 25 and 31 engage the opposite edges of the film to retain the latter in registry with the aperture 18. The portion 64 is then moved about its hinge 92 to close the gate and to clamp the film in a plane. The loaded gate is then slid rearwardly to the printing position shown in full line in Fig. 2.

In order that these gates may be selectively used for either strip or cut film, means is provided whereby the member 20 and the portion 64 may act as a unit to constitute a unitary upper gate member when a film strip is used. To this end a pair of connecting portions 94 and 95, see Fig. 2, are provided between the member 20 and the portion 64. Each of these connecting members comprises a lug 96 on the plate 20 which extends under and engages a lip 97 on the portion 64, as shown in Fig. 8. Thus any tilting movement of the plate 20 will be imparted to the members 96 and 97 to move the portion 64 as a unit therewith. For these reasons the member 20 and the portion 64 may be broadly considered as a unitary upper gate member.

It is thus apparent from the above description that the present invention provides a glassless film gate construction which may be selectively used to position separate image areas or image areas arranged in the form of a strip. It is also apparent that the various image areas are maintained in flat position in the film gate without the use of the usual glass clamping strips. The opening of the film gate to permit the film strip to be moved therethrough or to be positioned therein also moves a light obstructing shutter to an inoperative position and turns on a viewing lamp so that the image area may be readily viewed in the film gate.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

We claim:

1. In a photographic printing apparatus, the combination with an apertured support, of a glassless film gate comprising a pair of hinged gate members removably positioned on said support and arranged to clamp a film area substantially in a plane to permit printing therefrom, said gate members being formed with registering apertures, means for positioning said gate on said support to bring said apertures into registering alignment, means on said support resiliently engaging one of said members directly to retain said members in film clamping position, and means on said support movable into engagement with said one member to move positively the latter relative to the other member to open said gate against the action of said resilient means.

2. In a photographic printing apparatus, the combination with an apertured support, of a film gate comprising a pair of hinged gate members removably positioned on said support and arranged to clamp a film area substantially in a plane to permit printing therefrom, said gate members being formed with registering apertures, means for positioning said gate on said support to bring said apertures into registering alignment, a leaf spring on said support arranged to engage one of said members to move the latter to film clamping position, a pivoted arm mounted on said support and movable into engagement with said one member to move the latter to film releasing position, and means for moving said arm.

3. In a photographic printing apparatus, the combination with an apertured support, of a film gate comprising a pair of hinged gate members removably positioned on said support and arranged to clamp a film area substantially in a plane to permit printing therefrom, said members being formed with registering apertures, means for positioning said gate on said support to bring the apertures thereof into registering alignment, a pivoted shutter mounted on said support adjacent said gate, means tending to hold said gate members in film clamping position, means arranged to engage one of said members to move the latter to open said gate to permit said film to be positioned therein, and means on said last mentioned means for moving said shutter to an inoperative position when said gate is opened to permit viewing of the film area being positioned in the gate.

4. In a photographic printing apparatus, the combination with an apertured support, of a film gate comprising a pair of hinged gate members removably positioned on said support and arranged to clamp a film area substantially in a plane to permit printing therefrom, said gate members being formed with registering apertures, means for positioning said gate on said support to bring said apertures into registering alignment, stationary and retractable positioning pins carried by one of said members and arranged adjacent opposite edges of the aperture thereof for positioning said film area in registry with said gate apertures, and resilient means on said support engaging the other of said members to hold yieldably said gate in closed position.

5. In a photographic printing apparatus, the combination with an apertured support, of a film gate comprising a pair of hinged gate members removably positioned on said support and arranged to clamp a film area substantially in a plane to permit printing therefrom, said gate members being formed with registering apertures, means for positioning said gate on said support to bring said apertures into registering alignment, positioning pins mounted on one of said members adjacent the aperture thereof for positioning said film area in registry with said gate apertures, means for movably mounting certain of said pins so that the latter may be momentarily moved to an inoperative position when the film is inserted in said gate, and means on said support engaging said one member to retain said gate members in film clamping position.

6. In a photographic printing apparatus, the combination with an apertured support, an apertured base removably positioned on said support, means for adjusting said base on said support to bring said apertures into alignment, a film gate comprising a pair of hingedly connected apertured members slidable on said base, means on said base for guiding and positioning said gate thereon, means on said base yieldably engaging one of said members and tending to hold said gate in closed position, and means on said base independent of said last mentioned means for opening said gate to permit a film strip to be positioned therein.

7. In a photographic printing apparatus, the combination with an apertured support, an apertured base removably positioned on said support, means for adjusting said base on said support to bring said apertures into alignment, a film gate comprising a pair of hingedly connected members slidable on said base, said gate members being formed with registering apertures, means for guiding said gate on said base, means for limiting the movement of said gate in one direction on said base to position said gate apertures in registery with the aperture in said base, means on said base engaging one of said members and tending to yieldably retain said members in film clamping position, a lug on said one member, and a pivoted arm on said base arranged to engage said lug to pivot said one member on the other member to open said gate.

8. In a photographic printing apparatus, the combination with an apertured support, an apertured base removably positioned on said support, means for adjusting said base on said support to bring said apertures into alignment, a film gate comprising a pair of hingedly connected members slidable on said base, said gate members being formed with registering apertures, means for guiding said gate on said base, means for limiting the movement of said gate in one direction on said base to position said gate apertures in registry with the aperture in said base, means on said base engaging one of said members and tending to yieldably retain said member in film clamping position, a lug on said one member, a pivoted arm on said base arranged to engage said lug to pivot said one member on the other member to open said gate, means for moving said arm, a pivoted shutter mounted on said base adjacent said gate, and means on said last mentioned means for moving said shutter to an inoperative position when said gate is opened to permit viewing of the film area being positioned in said gate.

9. In a photographic printing apparatus, the combination with an apertured support, an apertured base removably positioned on said support, means for adjusting said base on said support to bring said apertures into alignment, a film gate comprising a pair of hingedly connected members slidable on said base, said gate members being formed with registering apertures, means for guiding said gate on said base, means for limiting the movement of said gate in one direction on said base to position said gate apertures in registry with the aperture in said base, means on said base engaging one of said members and tending to yieldably retain said members in film clamping position, positioning pins on one of said gate members for positioning a film area in registry with the gate apertures, a spring finger on said base engaging the other of said members and tending to yieldably retain said gate in closed position, a lug on said other member, and a pivotally mounted arm on said base member movable into engagement with said lug to move said other member relative to said one member to open said gate.

10. In a photographic printing apparatus, the combination with a supporting member formed with an aperture, of a film gate comprising a pair of hinged gate members removably positioned on said supporting member, said gate member being formed with registering apertures adapted to be positioned in registry with the aperture of said supporting member, a pair of fixed pins and a pair of retractable pins mounted on one of said gate members and positioned adjacent opposite edges of the apertures thereof to position said image area in registry with said aperture, means on one of said members for yieldably retaining said gate members in closed position to clamp an image area of a film strip therebetween to permit prints to be made therefrom, and means on one of said members for opening said gate to permit the moving of said film strip therethrough.

11. In a photographic printing apparatus, the combination with a supporting member formed with an aperture, of a film gate comprising a pair of hinged gate members removably positioned on said supporting member, said gate members being formed with registering apertures adapted to be positioned in registry with the aperture of said supporting member, a leaf spring on one of said members engaging another of said members to yieldably hold said gate members in closed position to clamp an image area of a film strip therebetween so that prints may be made therefrom, means on one of said members arranged to engage one of said gate members to move said one gate member relative to the other of said gate members to open said gate to permit the moving of said film strip therethrough, and means for positioning said gate on said supporting member.

12. In a photographic printing apparatus, the combination with a supporting member formed with an aperture, of a film gate comprising a pair of gate members formed with registering apertures, a spring hinge for pivotally connecting said gate members adjacent one edge, means for positioning said gate members on said supporting member to bring said apertures into registering alignment, a leaf spring secured to one of said members and engaging another of said members to yieldably press said gate members toward each other to clamp an image area of a film strip therebetween so that prints can be made therefrom, and means on one of said members arranged to engage one of said gate members to separate said gate members to permit said strip to be moved therethrough.

D'ARCY A. YOUNG, Jr.
PAUL C. STETSON.